United States Patent [19]
Wellman

[11] 4,085,810
[45] Apr. 25, 1978

[54] WEIGHT BEARING TREADLE

[76] Inventor: Lester R. Wellman, 110 Lakewood Pl., Highland Park, Ill. 60035

[21] Appl. No.: 749,773

[22] Filed: Dec. 13, 1976

[51] Int. Cl.² .............................................. G01G 5/04
[52] U.S. Cl. .................................... 177/209; 177/254
[58] Field of Search ........................ 177/208, 209, 254

[56] References Cited

U.S. PATENT DOCUMENTS

| 3,791,375 | 2/1974 | Pfeiffer | 177/209 X |
| 3,974,491 | 8/1976 | Sipe | 177/209 X |
| 3,985,191 | 10/1976 | Wellman | 177/208 |
| 4,007,800 | 2/1977 | Janach et al. | 177/209 |

FOREIGN PATENT DOCUMENTS

| 218,636 | 1/1958 | Australia | 177/209 |

Primary Examiner—George H. Miller, Jr.
Attorney, Agent, or Firm—Richard D. Stone; Robert W. Erickson

[57] ABSTRACT

An improved treadle for use in a compact, portable weighing scale comprising a load-bearing, pressure-developing displacement treadle connected to a volume-reacting, weight-indicating readout means. The treadle contains a first sealed collapsible chamber sealed at one end and communicating with the readout means at the other, and a second, fully sealed collapsible chamber not communicating with the readout means. The second sealed chamber improves the compression characteristics of the collapsible chamber. At least one collapsible chamber is preferably formed from flexible tubing which is reinforced with braiding. A treadle comprising two treadle plates, and a means of compacting same, are also disclosed.

10 Claims, 5 Drawing Figures

WEIGHT BEARING TREADLE

APPLICABILITY OF INVENTION

The present invention is directed toward an improved treadle for use in a compact, portable weighing scale. More specifically, the invention concept herein described encompasses a personal portable weighing scale of a size which affords convenient storage, or carrying in a handbag, pocket, suitcase, or back pack. Therefore, although suitable for utilization within the household, the present "mini-scale" is ideally suited for use when away from home.

The present invention improves upon, and is, therefore, closely related to my U.S. Pat. No. 3,985,191 (Cl. 177-208), issued Oct. 12, 1976, all the teachings of which are incorporated herein by reference thereto. Briefly, my previous invention is directed toward a portable mini-scale comprising a weight-bearing treadle formed by two spaced-apart, substantially parallel surfaces and containing a collapsible chamber. Communicating with the chamber is a conduit, preferably about 6 feet of small diameter flexible tubing for ease in eye-level observation of weight-indicating readout means connected to and communicating with the opposite end of the conduit. In operation, the weight of an object, or person on the treadle collapses the chamber which causes a compressed bellows in the readout means to expand in proportion. Expansion of the bellows actuates movement of a weight-indicating cylindrical scale.

The present invention relates primarily to improvements in the weight-bearing treadle. The treadle disclosed in my prior patent consists of helical coils of flexible tubing disposed within two flat surfaces. A person stands on the treadle, and partially compresses the tubing, thereby causing fluid to be transmitted to the weight-indicating readout means. The device works well, but some deficiencies have been observed. With flexible tubing, such as Tygon tubing, the prolonged application of force causes the tubing to stretch, so that the indicated weight changes when someone remains on the scale for an extended length of time. Another problem is that uneven application of force causes the tubing to at least partially collapse, and thus be pinched shut. Pinched tubing, obviously, cannot transmit fluid to the readout means and erroneous weights may result.

These problems are largely eliminated through the use of a closed portion of tubing, preferably filled with a fluid, to improve the elastic characteristics of the treadle. Preferably, a double helix of (1) closed tubing and (2) tubing open at one end to the readout means, will be used. The closed tubing acts as an elastic member and also functions to reinforce the side walls of the tubing which is connected to the readout means.

Other improvements in the treadle include use of two treadle plates, and a better layout of the coils within the treadle, a way of folding the treadle plates wherein tabs are disposed at staggered loci on each treadle shroud to permit the tubing to the readout means to be wrapped around a channel formed by the plates and hold them in intimate contact, and use of flexible tubing containing braided reinforcement, incorporation of guards in the treadle surface to protect the tubing where joints are made, and incorporation of a hard cord or line inside the tubing to eliminate the possibility of pinching shut some portion of the tube.

Accordingly, the present invention provides an improved weight bearing treadle comprising in cooperative combination: (a) at least one treadle plate; (b) a flexible tube disposed upon said plate and adapted to react to a weight, and wherein (i) said flexible tube is sealed at one end and, (ii) connectable to a readout means at the other end; and, (c) a resilient member contiguous with at least a portion of said flexible tube to provide side-wall support thereto when said flexible tube is compressed.

SUMMARY OF THE INVENTION

As hereinbefore stated, the present invention provides a compact, portable weighing scale improving upon that which is disclosed and defined in my prior U.S. Pat. No. 3,985,191.

The most significant improvement over the operation of my prior patent is afforded by incorporation of two types of collapsible tubing within the treadle means. One portion of the tubing is open to the weight-indicating readout means. This tubing functions in a fashion similar to that of my prior patent. When weight is applied to the treadle, the tubing is compressed and fluid is displaced from the tubing to the readout means. One improvement is the incorporation of a second tube which is sealed at both ends. The function of the sealed tube is twofold: (1) to improve the elastic characteristics of the scale; and, (2) to provide a significant amount of side-wall support for the open tubing. It is not necessary for the sealed tubing to be equal in length to the open tubing, though such configuration comes within the scope of my invention. I have found that it is possible to obtain much improved operation by providing sealed tubing in contact with open tubing for even a single 360° spiral, when the open tubing is disposed as a spiral. When the open tubing is disposed within the treadle means as a series of back-and-forth, or reflex, loops the improved operation is obtained by providing at least on length of closed tubing, in contact with at least one loop along substantially its entire length.

The sealed tubing may be similar in size and shape to the tubing open to the readout means. The sealed tubing may be filled with a compressible fluid, such as air, or an incompressible one, e.g., water. It is also within the scope of the present invention to provide a fluid within the sealed tubing which is under a pressure different from atmospheric, e.g., air at a total pressure of 1.15 atmospheres, absolute. It is also possible to use tubing which is solid, or which has a shape other than tubular. What is essential is that the sealed tubing provides side-wall support to the tubing open to the readout means, and also impart resiliency to the treadle.

Another feature which improves the operation of the scale and which compliments the use of some closed tubing contiguous to the open tubing, is to provide braiding on the outside of the tubing. Any non-stretching braiding material can be used, and may be applied by conventional means. The function of the braiding is to provide additional support to the tubing to prevent excessive deformation under sustained stress. Many types of tubing which are suitable for use, such as Tygon tubing, tend to retain a deformed shape when force is applied to them for several minutes. This property is objectionable because it allows the tubing to remain collapsed, and this causes fluid to remain displaced from the open tubing to the readout means. This prevents fluid return to the treadle, so the following weighing may be incorrect. This hysteresis is undesirable in a scale. The braiding, or reinforcing material, may be applied only to the exterior of the tube, in which case it will provide support to the tube during compression and will prevent an increase in the tube's circumference. Alternatively, the braiding may be embedded wholly or partially within the tube wall to provide additional limited flexibility in the tube, when these properties are desirable.

Another feature of the improved scale which complements the above feature is incorporation of rigid or semi-rigid guards to protect the tubing from crushing at joints. Points of severe stress occur wherever two portions of tubing must be joined together, or when tubing leaves the treadle. Tubing connectors are typically made of a semi-rigid material, and a tight friction fit may be used, at least initially, to join tubing to a tubing connector. There is a slight increase in diameter of the tubing as it slips over a tubing connector and the materials being dissimilarly deformed work differently under load so that the joint may leak. To protect these sensitive portions of the open tubing, a raised channel is preferably provided in the treadle plates.

Yet another step in eliminating one of the minor problems encountered in my prior scale is incorporation of a closure prevention means within the open tubing. In one embodiment, this may take the form of a length of monofilament line, braided string, airway maintenance cord, or similar means within the tube connective with the readout means. The function of the closure prevention means is to make sure that even if excessive force is applied, it will be impossible to completely pinch shut the tubing, preventing flow to the readout means. Incorporation of a length of airway maintenance cord 1/16 inch diameter within a piece of braided Tygon tubing, 0.125 inch I.D. by 0.187 inch O.D., produces an assembly which cannot be pinched shut.

Further improvements resulted after studies which indicated that my prior scale was, for some people, difficult to use. In the prior scale, only a single treadle was provided with a single coil of open tubing within. It was difficult for some people to balance on the treadle, on the balls of their feet, to insure a proper weight reading. The system worked well, and was reproducible, but many consumers would be unwilling to take the time necessary to acquire the proper technique for using the scale. In one embodiment, the scale of the present invention completely eliminates these difficulties. Thus, preferably two interconnected treadles are provided, one for each foot.

When two treadles are employed, they should be closely aligned to facilitate ease in use. The use of tape hinges or other means to hold the two treadles together at the optimum distance significantly improves the accuracy of operation of the scale.

I have also provided a unique means of compacting or folding the device for storage or travel. In some embodiments, the scale of the present invention will be used in conjunction with a readout means attached to a long flexible tube. The tube is long so that the readout means can be held at eye-level by the user. There is a problem in storing the long flexible tubing leading to the readout means when the scale is not in use. I have managed to solve this storage problem, and also provided a unique way of holding the superimposed treadle plates together. I provide on the treadles, or preferably on a shroud covering the bottom of the treadle plates, inclined attachment means which form either leg of a "V" frame, or trough, in which the long flexible tube to the readout means can be placed. Wrapping of the flexible tube into the "V" results in a closely held pair of treadle plates, with the tubing to the readout means also neatly stored in the channel formed by the circumference of the stacked treadles.

The improved scale can use any readout means. The readout means disclosed in my prior patent consisted of a bellows, and helical rod used in conjunction with a weight-dimensioned indicating cylindrical scale. It would also be possible to use a very sensitive pressure gauge, or to let the fluid displaced from the open tube displace another fluid in a "U" tube, such as a "U" tube manometer. Another excellent readout means consist of a bellows similar to that used in my prior patent, but wherein the expansion of the bellows displaces a length of line connected to a rotary dial. In summary, any readout means capable of receiving an input of fluid flow and/or pressure, may be used with good results. The readout means forms no portion of the present invention.

BRIEF DESCRIPTION OF THE DRAWING

With reference now to FIG. 1, the treadle, indicated generally as 1, is shown in its open configuration. Two treadle plates 4 each contain dual spirals of tubing 3 used in conjunction with a partial spiral of sealed tubing 2. Tubing 3, as best shown in FIG. 2, contains a length of airway maintenance cord 13, which is similar to monofilament or braided line. The function of line 13 is to prevent complete collapse or pinching shut of tube 3. As best shown in FIG. 3, when this tubing is collapsed, a small triangular space 17 will be maintained on each side of the line 13, even when a great amount of pressure is exerted on the tube. FIG. 3 also indicates braiding material 14 wound around tube 3 used to reinforce the side walls of the tube.

Figure 1:
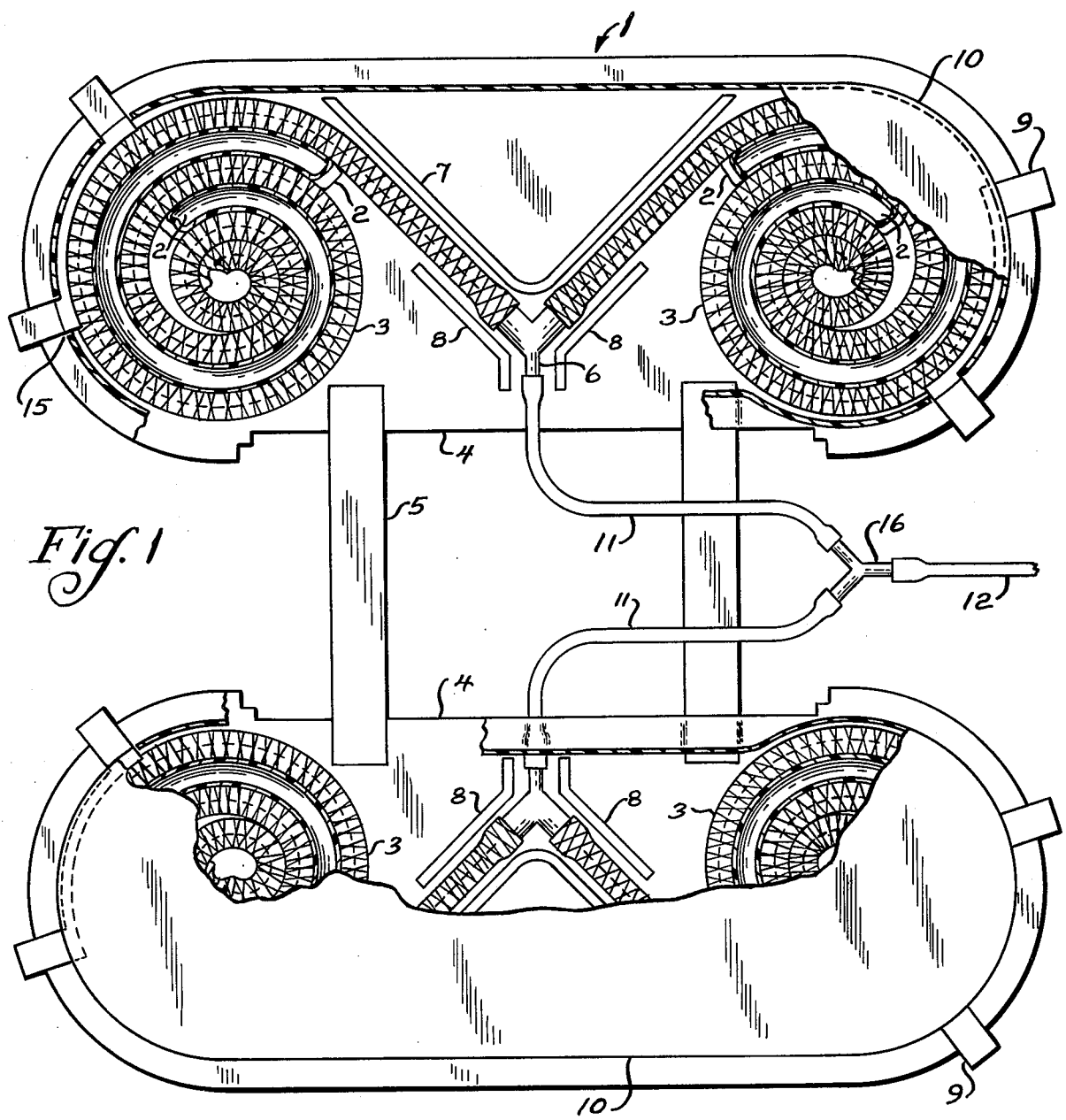
FIG. 1, is a plan view of the treadle assembly of one embodiment of the present invention.
Figure 2:
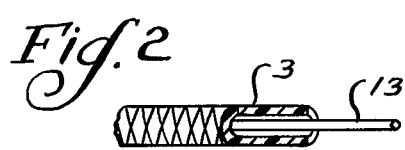
FIG. 2, is a broken-away view of the tubing showing the general position of a cord therein used in the treadle means and generally covered by the shroud.
Figure 3:
FIG. 3, is a sectional view of tubing used in the treadle subjected to compression showing airways held open within the tubing by cord.

The helical configuration of the open and sealed tubes 3 and 2, respectively, can be maintained either by glueing them together, welding the tubing with heat, or by providing relatively tight containment of the spirals within shroud 10. Preferably, the spiral configuration is maintained by heating the tube formed into a spiral so that the plastic will "remember" its shape. It is, of course, possible to make a treadle means 1 without heat treating these spirals, but the production of the device is made somewhat more complicated because the tube tends to return to its original linear shape rather than stay naturally in a spiral or helix.

The spacing between treadle plates 4 is maintained by tapes 5 which prevent the treadle plates from getting separated by more than the length of the tapes 5. Tapes 5 can be cloth, string, wire, bead chain, etc.

In the embodiment shown, two spirals of tubing are used on each treadle plate 4. It would be possible to make one spiral of a different size than the other spiral on the treadle; but, for ease of manufacturing and use of the device, the spiral portions are preferably all the same size. Because two spirals are used on each treadle plate, there must be a way of connecting these two spirals so that fluid displaced, or pressure indication from the spirals can be transmitted to the readout means. Two lengths of open tubing 3 on each plate are connected via a "Y" fitting 6, which permits transmission of fluid and/or pressure from tubing 3 to tubing 11, which passes beyond the boundaries of treadle plate 4. Fitting 6 may also take the form of a "T". Tubing 11 may be identical to tubing 3, but preferably, tubing 11 is of reduced diameter and more flexible. To protect the tubing from extreme stress when a user stands improperly upon the treadle, ridges 7 and 8 are preferably provided to ensure that no crushing force will be applied to tubing 3 stretched over the openings of rigid "Y" fitting 6. Ridges 8 also serve to protect tubing 11 from being pinched shut, or subjected to extreme cutting pressure if user stands improperly on the treadle plate. The ridges also prevent fluid leakage around the joints, as previously discussed.

It is necessary to transmit pressure and/or fluid flow generated from both of the dual spirals of tubing on each treadle plate 4. This is accomplished by transmitting the fluid, or pressure, in each tube 11 to "Y" fitting 16, which connects with tubing 12 going to the readout means. Tubing 12 is preferably minimal I.D. and similar to tubing 11.

Figure 4:
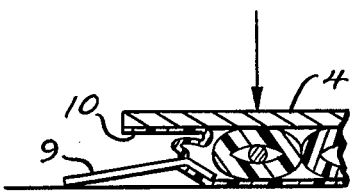
FIG. 4, is an enlarged, cross-sectional view of one portion of the treadle means showing the treadle in compression, with a compacting tab in a relief position and partially collapsed tube.
Figure 5:
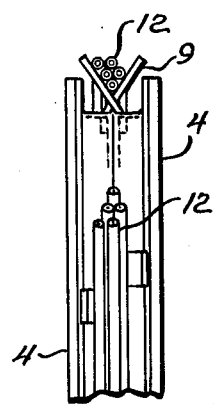
FIG. 5, is a view of the treadle means compacted for traveling, showing the operation of the compacting tabs, crossed and cradling several turns of small diameter tube to the readout means.

Within each shroud 10 are slits 15 permitting the insertion of tabs 9 for holding the treadle in a compacted state. The compacting means 9 are comprised of relatively stiff plastic tabs, held within shroud 10 by the connecting link either by interference fit, or with adhesive, or both. As shown in FIG. 4, the compacting means 9 offer almost no resistance to downward force applied to treadle plate 4 when the scale is in operation. This is a very important property of the compacting means 9 in that they will not interfere with the weighing process or the readout means nor deform. As shown in FIG. 5, the function of compacting means 9 is to provide intermittent flange support for winding tubing 12 about a channel when formed treadles are in the compacted position. Tubing 12 is thus neatly stored, while the two treadle plates 4 are held together by the interferring tabs 9, locked by the tubing which is generally quite lengthy to permit a user of the scale to hold the readout means at a position convenient for viewing. The compacting means 9 are staggered so that they form a V-shape, or V-trough, as shown in FIG. 5, to permit easy winding of tubing 12. Tubing 12 also locks tabs 9 due to the alternate direction of pull of tabs 9.

FIG. 1 actually shows the treadle means in an upside down position. During normal use, the treadle means 1 would be flopped 180° and placed on a flat, hard surface. Treadle plates 4 would be on top. In the treadle means disclosed in my prior patent, it was necessary to balance the balls of the feet evenly upon the treadle. Because of the use of two treadle plates in the present invention, it is preferred for the user merely to place one foot on each treadle plate and stand normally.

The best mode contemplated by me for practicing the present invention is as follows:

Treadle plates molded about 0.062 inch thick, except for heavier ribs, shown as 7 and 8 in the drawing, are formed from polycarbonate, ABS, or some other similar shock resistant material in a rectangle, with rounded ends, about 7.5 inches by 2.5 inches. Two pieces of PVC tubing of 0.187 inch O.D. by 0.125 inch I.D., which have been braided with 150/10 fiber glass, double wrapped about a 0.060 inch lead, or about 16 wraps per inch in two directions, the ends fixed with solvent of the Cadco-SC 201 type or equivalent or simply clove hitched, were then prepared. These two lengths of tubing were cut and preformed to produce a helix with about a 2.0 inch O.D. by wrapping the tubing in a flat spiral, placing it in a suitable fixture, and immersing the tubing for 40 seconds in water at 100° C. The fixture containing the tubing is then removed from the water, cooled to room temperature, and the tubing removed. Two finished helices from a double flat helix. Both tubes which will comprise the double helix are open at this point. One of the tubes is completely sealed at both ends by placing of the ends over a steel stub heated to 116° C. for two to five seconds, and then flat clamped immediately upon removal so that about a 0.25 inch length is thermally sealed. The fluid trapped within the tube is air in this embodiment, at ambient pressure. The clamps can be removed after six minutes when the assembly has cooled to room temperature. The other tube is now straightened by insertion into a length of 0.375 inch I.D. tubing, and a fish wire is then inserted. One end of the fish wire is hooked to receive the end of a monofilament or braided line (Gadding's Ideal, size C, is preferred). The line is then drawn through to about 0.25 inch from the end of the tubing. One end of this tube is thermally sealed as above. The tube containing the fish line returns to its helical shape after removing from the 0.375 inch tube. The open end of the tube, containing the fish line, is coated internally with solvent and slipped over one leg of a "Y" connector. A second similar tube is likewise attached to the other leg of the "Y" in a reverse coiling direction, but in the same plane. The assembly is placed in a fixture holding the entire assembly in a position which allows the double sealed tubes to be interwound so that each turn of one tube is separated by a turn of the other type. Thus, open tube containing a length of fishing line, is alternated with tubing which is sealed at both ends. A fixture consisting of a small molded urethane sponge disc is wet with solvent and "stamped" onto the molded treadle plate and the circular affected areas allowed to reach a tack point. At that point in time, the fixture with prepared assembly of tubing is carefully located concentric with the curved ends of the molded plate and held in place for five minutes under an exhaust hood. The fixture is then removed leaving the assembly bonded to the plate.

Preformed shrouds of sheet PVC are die cut to match the outline of the plate and extruded about 0.187 inch to accommodate and fit over the helices while leaving a flat area on a 0.25 inch rim provided with clearances for tubes and tapes. Prior to placement on the plate the rounded edges of the extruded portion are slit so that the blanked and formed tabs can be inserted through the slits up to the connecting link stops, which locate the tabs. Solvent is flowed between the link and the inner top of the shroud.

Plates with assembled helices are aligned parallel and 1.5 inches apart being connected with two 0.020 inch thick by 0.50 inch width PVC strips 2.250 inches long. These strips are placed parallel across the gap between the plates and the ends joined to the plates with solvent and clamps.

Small tubing, 0.031 inch I.D. by 0.093 inch O.D. has been made up into an assembly consisting of a 6 foot length 12 inserted into the tail of "Y" connector 16, and two three inch lengths inserted into each leg of the "Y" 16 after being wet with solvent. Now each short length is inserted into the tails of "Y" connectors 6 to complete the internal assembly of the treadles.

Now the prepared shrouds are placed over each treadle assembly and solvent is flowed in the edges with an industrial hypodermic syringe to affix the shroud to the treadle plate. All of this is preferably done under an exhaust hood for safety.

I claim as my invention:

1. A weight-bearing treadle having at least one substantially rigid horizontal plate and comprising, in cooperative relationship:
   (a) a reinforced, first flexible tube (i) disposed upon said horizontal plate and adapted to react compressively to a weight, and, (ii) sealed at one end thereof and connectable at the other end to a weight-read-out means; and,
   (b) a second flexible tube (i) sealed at both ends thereof and, (ii) in contiguous side-wall support relationship with at least a portion of said first flexible tube.

2. Treadle of claim 1 wherein said first flexible tube is reinforced with braid.

3. Treadle of claim 1 wherein said first flexible tube contains in the interior thereof a length of flexible relatively incompressible material.

4. The treadle of claim 1 further characterized in having two spaced-apart horizontal plates (i) each of which has disposed thereon said first and second flexible tubes, and, (ii) which are in co-planer relationship.

5. Treadle of claim 4 wherein the two treadle plates are hingedly connected by lengths of flexible tape.

6. Treadle of claim 4 wherein said first flexible tube comprises two helices symmetrically disposed upon each of said two treadle plates.

7. Treadle of claim 6 wherein each helix contains an interior helix of said second flexible tube encompassed by and contiguous with said first flexible tube.

8. Treadle of claim 6 wherein the flexible tubes of each of said double helices are joined together, within the perimeter of each treadle plate, by connection to a "Y" fitting, and wherein said tubes from each treadle plate are joined together between the treadle plates by connection to a "Y" fitting which is connectable to readout means, and wherein the tubing slipped over legs of the "Y" fitting within the perimeter of each treadle plate is located within rigid protective ridges on each treadle plate.

9. Treadle of claim 6 wherein each pair of double helices on each plate is covered by a protective shroud.

10. Treadle of claim 9 wherein compacting means are provided in said shroud consisting of at least four inclined tabs connected to said shroud and forming opposingly angled tabs which form a compacting means when said plates are in a closed, touching position, and wherein said tabs form a "V" shape, adapted to contain a length of flexible tubing thus maintaining said plates in a closed position.

* * * * *